(No Model.)

J. L. GETHINS.
GALVANIC BATTERY.

No. 487,324. Patented Dec. 6, 1892.

Witnesses.
Henry Marsh.
A. D. Harrison.

Inventor.
Jas. L. Gethins
By
Wight, Brown & Crossley.
His Solicitors.

UNITED STATES PATENT OFFICE.

JAMES L. GETHINS, OF BOSTON, MASSACHUSETTS, ASSIGNOR TO THE GETHINS ELECTRICAL MANUFACTURING COMPANY, OF MAINE.

GALVANIC BATTERY.

SPECIFICATION forming part of Letters Patent No. 487,324, dated December 6, 1892.

Application filed May 15, 1891. Serial No. 392,871. (No model.)

*To all whom it may concern:*

Be it known that I, JAMES L. GETHINS, of Boston, in the county of Suffolk and State of Massachusetts, have invented certain new and useful Improvements in Galvano-Electric Batteries, of which the following is a specification.

The invention relates to galvanic batteries of the gravity class or kind, its object being to provide such improvements as will preserve and enhance the strength of the current to a maximum degree, reducing the resistance of the cell to the minimum.

The invention consists of the improvements which I will now proceed to describe and claim, reference being had to the annexed drawings, and to the letters of reference marked thereon, forming a part of this specification, the same letters designating the same parts or features, as the case may be, wherever they occur.

Figure 1:
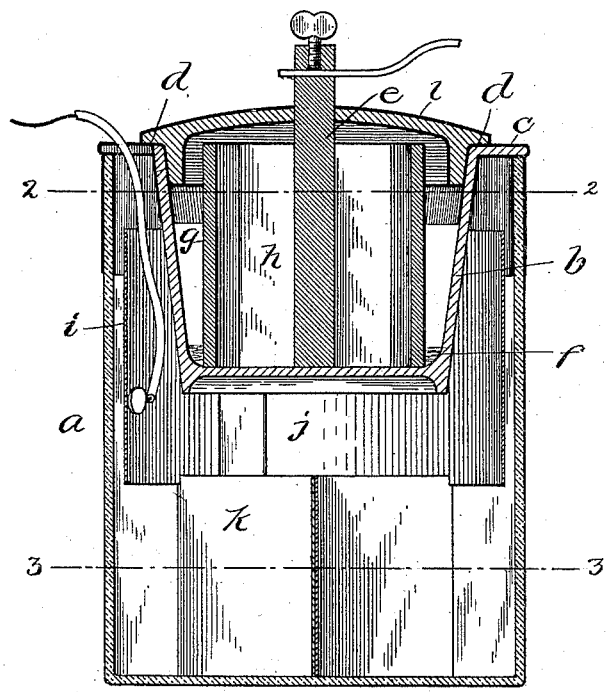
Figure 2:
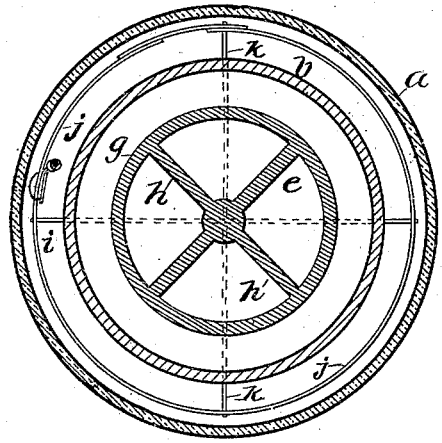
Figure 3:
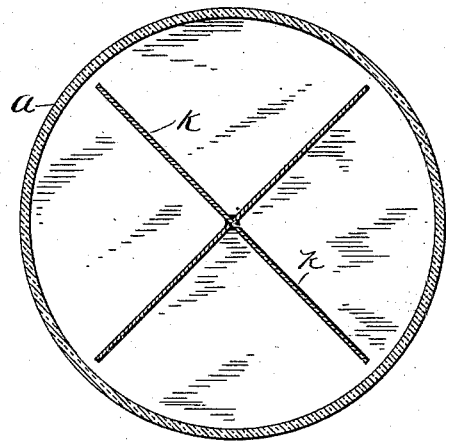

Of the said drawings, Figure 1 is a vertical central sectional view of a gravity-battery constructed and equipped in accordance with my invention. Fig. 2 is a cross-sectional view of the same, taken on the line 2 2 of Fig. 1. Fig. 3 is a similar sectional view taken on the line 3 3 of Fig. 1.

In carrying out my invention I provide a jar $a$, of glass or other similar material having suitable insulating properties, forming the cell or receptacle of the battery.

$b$ designates a porous cup provided with a flange $c$ or equivalent devices, adapted to extend over and rest upon the upper edge of the jar and support the cup in the latter, the cup reaching down into the jar to the extent of about half its depth. The upper edge of the jar, as also the flange and upper portion of the porous cup, are covered or glazed with a coating $d$, of asphaltum paint or similar substance to which the solution of sulphate of zinc will not adhere, and so will not be raised by capillary attraction and creep over the edges of the jar and cup, as is usual with most batteries of this kind.

$e$ designates the zinc electrode, which dips into the mercury $f$ in the bottom of the porous cup. The said zinc electrode consists of a cylindrical portion $g$, in the interior of which and radiating from the center are a plurality of webs or wings $h$, which extend to and are connected at their outer edges with the cylindrical portion $g$.

$i$ designates the copper electrode, which consists of a substantial cylinder $j$, surrounding the sides of the porous cup $b$, and a plurality of radiating webs or wings $k$, arranged below the cup. In some instances the cylindrical portion of the copper electrode may extend down and surround the radiating wings $k$, though in most cases I find the arrangement shown in the drawings to answer the desired requirements.

The battery may be charged with crystals of sulphate of copper, covering the copper electrode, and with water, both in the jar and in the porous cup. When the circuit of the battery is closed, there will be two layers of liquids—solutions of sulphate of copper and sulphate of zinc—formed, as will be readily understood by those skilled in the art. These solutions are divided in such manner as to obtain the best chemical results, the solution of zinc being in the upper portion of the jar or cell and the solution of copper in the lower portion and divided by the porous cup, as are the solutions in an ordinary gravity-cell when in the best condition.

By providing a zinc electrode of the form shown, consisting of a cylinder having a plurality of webs or wings radiating from the center to the cylinder or circumference and arranging the copper electrode so as to surround the porous cup, as well as to extend beneath it, I am enabled to present a maximum extent of surface to the solutions, and so obtain a proportionate strength of current.

I may employ my improved zinc electrode with a different form of copper electrode, and also I may use the copper electrode shown and described with a different form of zinc electrode. Moreover, in the use of my improved copper electrode I may vary the form of the portion below the cup, and I may likewise vary the form of the portion surrounding the cup.

Having thus explained the nature of my invention and described a way of constructing and using the same, though without attempting to describe all of the ways in which it may be made or all of its modes of use, I declare that what I claim is—

A galvano-electric battery comprising in its construction a jar or cell, a porous cup in said cell, a zinc electrode in said cup, and a copper electrode consisting of a cylindrical portion surrounding the sides of the cup and a plurality of radiating wings underneath the cup, substantially as described.

In testimony whereof I have signed my name to this specification, in the presence of two subscribing witnesses, this 27th day of March, A. D. 1891.

JAMES L. GETHINS.

Witnesses:
ARTHUR W. CROSSLEY,
A. D. HARRISON.